(12) United States Patent
Alshammary

(10) Patent No.: US 9,936,835 B2
(45) Date of Patent: Apr. 10, 2018

(54) COFFEE MAKER AND COFFEE BREWING METHOD BASED ON COLOR

(71) Applicant: Abdullah Ghali Alshammary, Huntington, WV (US)

(72) Inventor: Abdullah Ghali Alshammary, Huntington, WV (US)

( * ) Notice: Subject to any disclaimer, the term of this patent is extended or adjusted under 35 U.S.C. 154(b) by 47 days.

(21) Appl. No.: 15/204,573

(22) Filed: Jul. 7, 2016

(65) Prior Publication Data

US 2018/0008088 A1 Jan. 11, 2018

(51) Int. Cl.
| A23N 12/08 | (2006.01) |
| A47J 31/42 | (2006.01) |
| A47J 31/40 | (2006.01) |
| A23F 5/26 | (2006.01) |
| A23F 5/24 | (2006.01) |
| A23F 5/04 | (2006.01) |
| A23F 5/08 | (2006.01) |

(52) U.S. Cl.
CPC ............... *A47J 31/42* (2013.01); *A23F 5/04* (2013.01); *A23F 5/08* (2013.01); *A23F 5/24* (2013.01); *A23F 5/262* (2013.01); *A23N 12/08* (2013.01); *A47J 31/405* (2013.01)

(58) Field of Classification Search
CPC ...... A23F 5/04; A23F 5/08; A23F 5/24; A23F 5/262; A23N 12/08–12/125; A47J 31/404–31/405; A47J 31/42; A23L 2/00
USPC ........ 99/286, 323.3; 426/594–596, 466–469, 426/518, 520, 432–434
See application file for complete search history.

(56) References Cited

U.S. PATENT DOCUMENTS

| 1,896,230 A | * | 2/1933 | Guglielmo Farago | A23N 12/10 241/101.2 |
| 3,544,331 A | * | 12/1970 | Hair | A23F 5/08 426/388 |
| 3,700,462 A | * | 10/1972 | Stefanucci | A23F 5/04 426/388 |
| 4,053,652 A | * | 10/1977 | Mahlmann | A23F 5/04 241/2 |
| 4,081,569 A | * | 3/1978 | Gregg | A23F 5/10 426/466 |
| 4,815,633 A | * | 3/1989 | Kondo | A47J 31/40 221/96 |

(Continued)

FOREIGN PATENT DOCUMENTS

WO  WO 2014/207616 A1  12/2014

*Primary Examiner* — Drew E Becker
(74) *Attorney, Agent, or Firm* — Oblon, McClelland, Maier & Neustadt, L.L.P.

(57) ABSTRACT

A coffee maker and a method of brewing coffee are disclosed. The coffee maker includes a first roaster fitted, a second roaster fitted, and a funnel detachably attached to the first roaster providing a passage for a first amount and a second amount of coffee beans. Further, a grinder including a discharge door and a blade is detachably attached to a bottom of the funnel, a brewing container detachably attached to the bottom of the grinder. A color panel is included with a plurality of buttons, each of the plurality of the buttons corresponds to a color of a coffee desired after brewing, and a coffee-color controller configured to control the first temperature and the second temperature of the first roaster and the second roaster, respectively, based on the color of the coffee selected from the color panel.

11 Claims, 4 Drawing Sheets

(56) References Cited

U.S. PATENT DOCUMENTS

| | | | | |
|---|---|---|---|---|
| 4,949,632 A * | 8/1990 | Camerini Porzi | A23N 12/12 | 34/364 |
| 5,083,502 A * | 1/1992 | Enomoto | A47J 31/42 | 241/65 |
| 5,287,795 A | 2/1994 | Enomoto | | |
| 5,307,733 A | 5/1994 | Enomoto | | |
| 5,458,295 A * | 10/1995 | Haber | A47J 42/50 | 241/100 |
| 5,632,449 A * | 5/1997 | Sandolo | A47F 1/02 | 241/100 |
| 5,690,283 A * | 11/1997 | Sandolo | A47F 1/02 | 241/100 |
| 6,725,889 B2 * | 4/2004 | Perez Vales | A47F 1/035 | 141/104 |
| 8,162,176 B2 * | 4/2012 | Rudick | B67D 1/0888 | 222/1 |
| 2001/0044750 A1 * | 11/2001 | Piotrowski | G06Q 30/02 | 705/26.1 |
| 2005/0199646 A1 * | 9/2005 | Moy | B67D 1/0021 | 222/1 |
| 2008/0140535 A1 * | 6/2008 | Turgeon | G06Q 30/06 | 705/15 |
| 2009/0069932 A1 * | 3/2009 | Rudick | B67D 1/0888 | 700/239 |
| 2010/0009039 A1 * | 1/2010 | Robinson | A23C 9/142 | 426/72 |
| 2013/0189405 A1 * | 7/2013 | Filliol | A47J 31/52 | 426/231 |
| 2016/0097711 A1 * | 4/2016 | Wang | G01N 21/359 | 250/206 |
| 2016/0143475 A1 * | 5/2016 | Wessels | G07F 9/023 | 426/416 |
| 2016/0338376 A1 * | 11/2016 | Kelly | A23F 5/04 | |
| 2016/0338525 A1 * | 11/2016 | Fain | A47J 31/52 | |
| 2017/0156362 A1 * | 6/2017 | Tan | A23F 5/04 | |

\* cited by examiner

COFFEE MAKER AND COFFEE BREWING METHOD BASED ON COLOR

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

Field of the Disclosure

This application relates generally to improvements to a coffee maker. More particularly the present disclosure relates to improvements relating to obtaining a coffee of desired color, flavor and/or taste.

Description of the Related Art

Coffee drinks typically possess properties such as acidity, bitterness, body, astringency, sweetness, and so forth that generally affect the taste of the coffee drink. Such properties result from different roasting levels of coffee beans. For example, a greater time spent roasting the coffee bean, the darker the coffee beans gets, resulting in a more full-bodied and flavorful the coffee drink.

Conventional home coffee makers require the coffee beans to be purchased in a ground form, which can be readily brewed to get coffee quickly. However, different consumers can have different roasting preferences, taste preference, or color preferences. For instance, consumers from different countries may have different taste, coffee color and roasting preferences. As such there remains a continuing need to provide improved coffee makers that can brew coffee at different roasting level quickly and efficiently.

SUMMARY

According to an embodiment of the present disclosure, there is provided a coffee maker. The coffee maker includes a first roaster fitted with a first heating element to roast coffee beans at a first temperature and a first discharge door at the bottom of the first roaster, and a second roaster fitted with a second heating element to roast coffee beans at a second temperature and a second discharge door at the bottom of the second roaster. A funnel is detachably attached to the first roaster providing a passage for a first amount and a second amount of coffee beans received from the first roaster and the second roaster, respectively. A grinder having a blade is detachably attached to a bottom of the funnel and a discharge door at a bottom of the grinder. A brewing container is detachably attached to the bottom of the grinder. The coffee maker further includes a color panel including a plurality of buttons, each of the plurality of the buttons corresponds to a color of a coffee desired after brewing, and a coffee-color controller configured to control the first temperature and the second temperature of the first roaster and the second roaster, respectively, based on the color of the coffee selected from the color panel.

Further, according to an embodiment of the present disclosure, there is provided a method for brewing coffee. The method includes receiving, using processing circuitry, a color from a color panel of a coffee maker, setting, using the processing circuitry, a first temperature for a first time to roast coffee beans in a first roaster, and setting, using the processing circuitry, a second temperature for a second time to roast coffee beans in a second roaster. Further, the method includes passing a first amount of coffee beans from the first roaster and a second amount of coffee beans from the second roaster by controlling a first discharge door and a second discharge door, using the processing circuitry, starting, using the processing circuitry, a blade of the grinder to grind the coffee beans. Further, the method includes measuring, using a measuring device, an amount of ground coffee based on a number of coffee requested, and starting, using the processing circuitry, brewing of ground coffee received from the grinder.

Further, according to an embodiment of the present disclosure, there is provided a non-transitory computer-readable medium which stores a program which, when executed by a computer, causes the computer to perform the method for brewing coffee, as discussed above.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Figure 1:
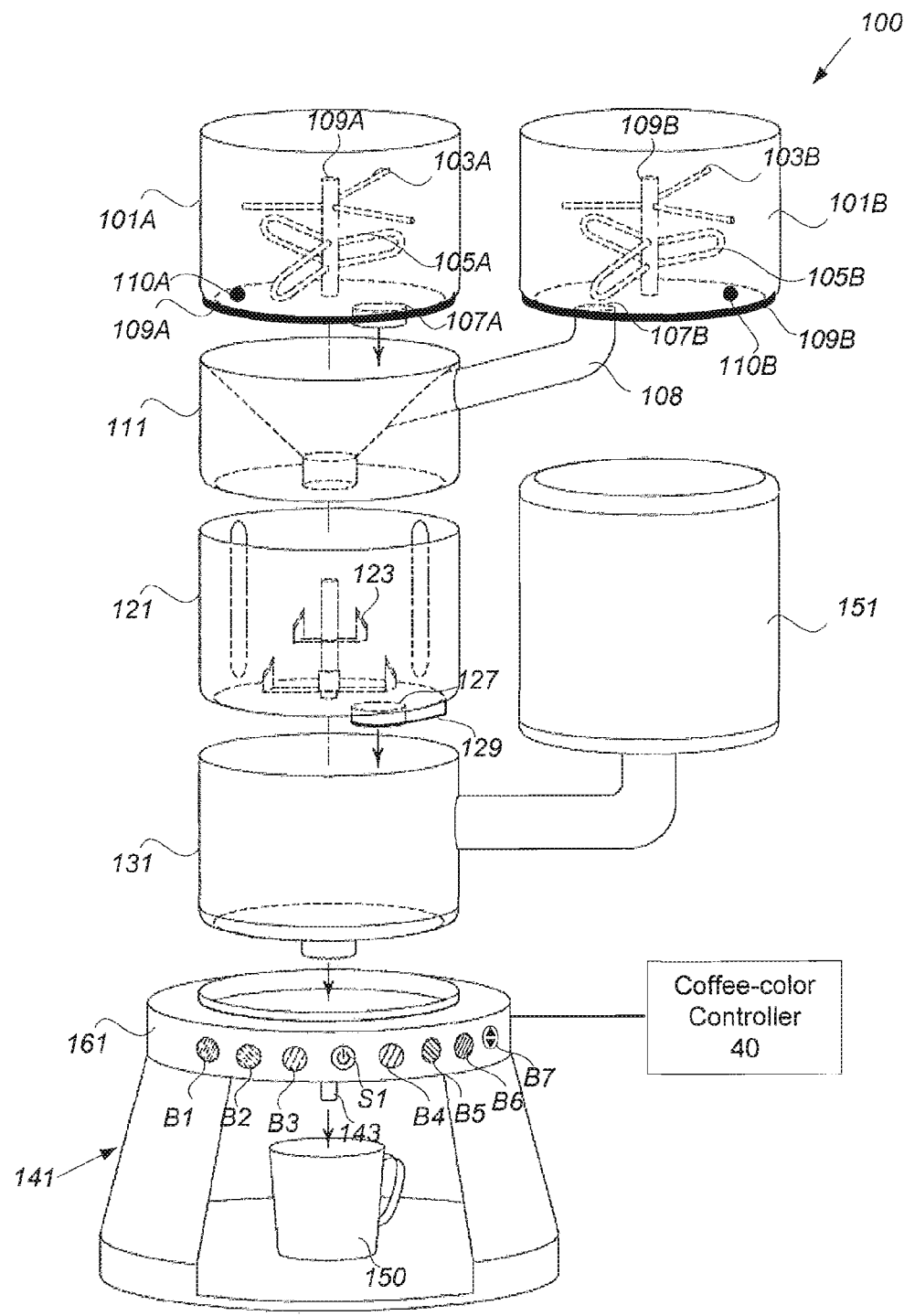
FIG. 1 illustrates a coffee maker according to an exemplary embodiment of the present disclosure.

FIG. 1 illustrates a coffee maker according to an exemplary embodiment of the present disclosure. A coffee maker 100 is an assembly of several parts including a first roaster 101A and a second roaster 101B, a funnel 111, a grinder 121, a brewing container 131, a base 141, a water tank 151, a color panel 161, and a coffee-color controller 40. The first roaster 101A and the second roaster 101B are connected to the funnel 111, which directs the coffee beans from the first roaster 101A and the second roaster 101B to the grinder 121. At a bottom side the grinder 121, the brewing container 131 is connected. The brewing container 131 brews the ground coffee from the grinder 121 and using hot water from the water tank 151. Typically, the water tank 151 includes an electric heater (not illustrated) to heat the water. After brewing, the coffee can be served in a coffee cup 150.

The first roaster 101A and the second roaster 101B (also referred as roasters 101) are provided in the uppermost part of the coffee maker 100. The roasters 101 are containers that roast the raw coffee beans placed inside. The roasters 101 can be made of metal such as steel or aluminum. Inside the roaster 101, at the bottom, a heater (e.g., 105A and 105B) is provided for roasting, and a high-temperature catalyst filter can be provided for smoke and odor removal. In addition, a coffee bean discharge door (e.g., 107A and 107B) is provided at the bottom of the roaster 101, and the discharge door (e.g., 107A and 107B) is solenoid operated, as such can be opened and closed by controlling a solenoid (not illustrated). Furthermore, a temperature sensor (e.g., 110A and 110B) can be installed on the bottom part of the roaster 101 to detect the roasting temperature. The temperature sensor can transmit the temperature information to the coffee-color controller 40.

In one embodiment of the present disclosure, the first roaster 101A includes a first heating element made of a first top heater 103A and a first bottom heater 105A. The first top heater 103A can roast the coffee beans at the top while the first bottom heater 105A can roast the coffee beans at the bottom of the first roaster 101A causing a uniform heating effect. The first top heater 103A and the first bottom heater 105A can be mounted on a first shaft 109A driven by a first motor (not shown). The first motor can be connected to the first shaft 109A on the underside (external bottom part) of the first roaster 101A via an anti-thermal-conduction joint to rotate the first shaft 109A creating a stirring effect resulting in uniform heating of the coffee beans. In order to prevent any adverse effects from the radiation of heat from the first roaster 101A, a radiant heat blocking plate 109A can be arranged beneath the first roaster 101A, thus isolating the first roaster 101A from other components. The radiant heat blocking plate 109A can be made from an iron plate or other heat insulating materials.

The second roaster 101B can be similar in construction to the first roaster 101A. Accordingly, the second roaster 101B includes a second heating element made of a second top heater 103B and a second bottom heater 105B mounted on a second shaft 109B driven by a second motor to maintain uniform heating of the coffee beans as discussed earlier. Also, a radiant heat blocking plate 109B can be arranged beneath the second roaster 101B.

At the bottom of the first roaster 101A, a first discharge door 107A is included to pass roasted coffee beans to the funnel 111 and a first temperature sensor 110A to monitor the roasting temperature. The opening and closing of the first discharge door 107A can be controlled by a solenoid that in turn is controlled by the coffee-color controller 40. Similarly, at the bottom of the second roaster 101B, a second discharge door 107B is included to pass roasted coffee beans to the funnel 111 via a pipe 108 and a second temperature sensor 110A to monitor the roasting temperature. The pipe 108 can be inclined at an angle to allow coffee beans to pass under gravity from the second roaster 108 to the funnel 111 when the second discharge door 107B is opened. The opening and closing of the second discharge door 107B can be controlled by a solenoid which in turn is controlled by the coffee-color controller 40.

The funnel 111 is a device with a conical shaped cavity, a side hole to connect the pipe 108, and a bottom hole to pass the coffee beans to the grinder 121. In one embodiment of the present disclosure, the funnel 111 can include vents or cooling elements such as water conduits to the coffee beans before passing to the grinder 121.

The grinder 121 is detachably attached to the bottom of the funnel 111 for grinding the coffee beans. The grinder 121 can include be a mill type grinder with blades 123. Also, at the underside (external bottom part) of the grinder 121, outside the grinder 121, a measuring device 129 can be attached. The discharge door 127 of the grinder 121 can be operated by a solenoid similar to the discharge doors 107A and 107B of the first roster 101A and the second roaster 101B, respectively. The discharge door 127 of the grinder 121 can be opened or closed by the coffee-color controller 40.

Figure 2:
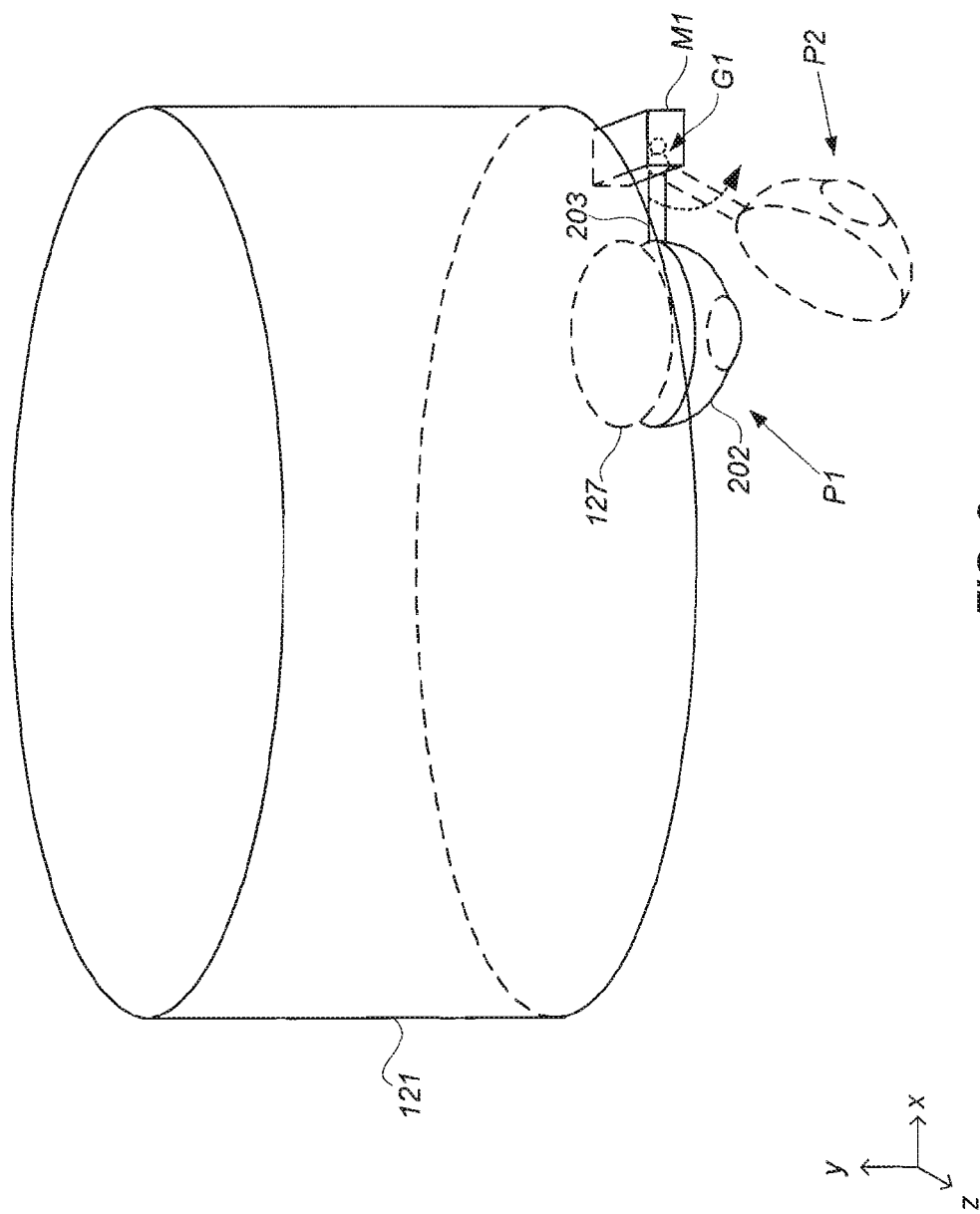
FIG. 2 illustrates a measuring device installed in the coffee maker according to an exemplary embodiment of the present disclosure.

As shown in FIG. 2, the measuring device 129 is a rotating block with a cup-shaped receptacle 202 to measure a fixed amount of ground coffee discharged through the discharge door 127 of the grinder 121. The fixed amount of ground coffee can be measured in volume or weight that is sufficient to make one cup of coffee after brewing. The receptacle 202 is attached to a shaft 203 connected to a motor M1 via a gear mechanism G1. The motor M1, controlled by the coffee-color controller 40, drives the gear mechanism G1. The gear mechanism G1 allows the measuring device 129 to occupy a first position P1 or a second position P2. To occupy the second position P2 from the first position P1, the gear mechanism G1 causes the shaft 203 to rotate about a z-axis, as shown.

In the first position P1, the receptacle 202 is aligned with the discharge door 127 touching the underside of the grinder 121 and the receptacle 202 collects the ground coffee when the discharge door 127 of the grinder 121 opens. In the second position P2, the receptacle 202 is not in contact with the underside of the grinder 121 and the shaft 203 makes an angle greater than 90° allowing the ground coffee in the receptacle 202 to fall in the brewing container 131.

Referring back to FIG. 1, the brewing container 131 can be detachably attached to the grinder 121, and hold a filter for brewing coffee. The brewing container 131 is installed on the base 141. After preparing the coffee, the brewing container 131 can be removed and the filter can be replaced. The brewing container 131 can receive hot water from the water tank 151 to brew the coffee. The liquid coffee is then discharged in the cup 150 placed on the base 141.

The base 141 supports the assembly of the first roaster 101A, the funnel 111, the grinder 121 and the brewing container 131. The base 141 includes a nozzle 143 and a slot to place a cup 150. After brewing, the coffee is delivered to the cup 150 through the nozzle 143. The base 141 also includes a start button S1 and the color panel 161 on which a plurality of buttons are disposed. Furthermore, a button to input number of cups of coffee (e.g., button B7) can be included as well. The base 141 can also act as a housing for the coffee-color controller 40.

The color panel 161 includes a plurality of buttons B1-B6, each button corresponds to a color of the coffee. For example, the button B1 can correspond to yellow color, the button B2 can correspond to tan color, the button B3 can correspond to light brown color, the button B4 can correspond to brown color, the button B5 can correspond to light French roast color, and the button B6 can correspond to full French roast color. A user can select a button to get a desired color of the coffee. The desired color is then received by the coffee-color controller 40 that controls the roasting, grinding and brewing to output a coffee of desired color.

The coffee-color controller 40 is configured to control a first temperature and a first time of the first heating elements 103A and 105A installed in the first roaster 101A, and the second temperature and a second time of the second heating elements 103B and 105B installed in the second roaster 101B. The coffee-color controller 40 also controls the amount of coffee beans by controlling the solenoid operated first discharge door 107A and the second discharge door 107B. A first amount of coffee beans can be passed through the first discharge door 107A into the funnel 111 and a second amount of coffee beans can be passed through the second discharge door 107B into the funnel 111 leading to the grinder 121. Once the coffee beans are collected in the grinder 121, the coffee-color controller 40 can start the blades 123 and stop when the coffee beans are ground. Additional details of the process implemented in the coffee-controller 40 are discussed with respect to FIG. 3, and an exemplary hardware configuration is explained with respect to FIG. 4.

A controller (for example, controller 405 or a CPU 400 of the coffee-color controller 40) or processing circuitry such as the coffee-color controller 40 includes a programmed processor. The processing circuitry or controller may also include devices such as an application specific integrated circuit (ASIC) and conventional circuit components arranged to perform the recited functions. Each of the functions of the described embodiments (with reference to FIG. 3) can be implemented by one or more processing circuits or controllers.

Figure 3:
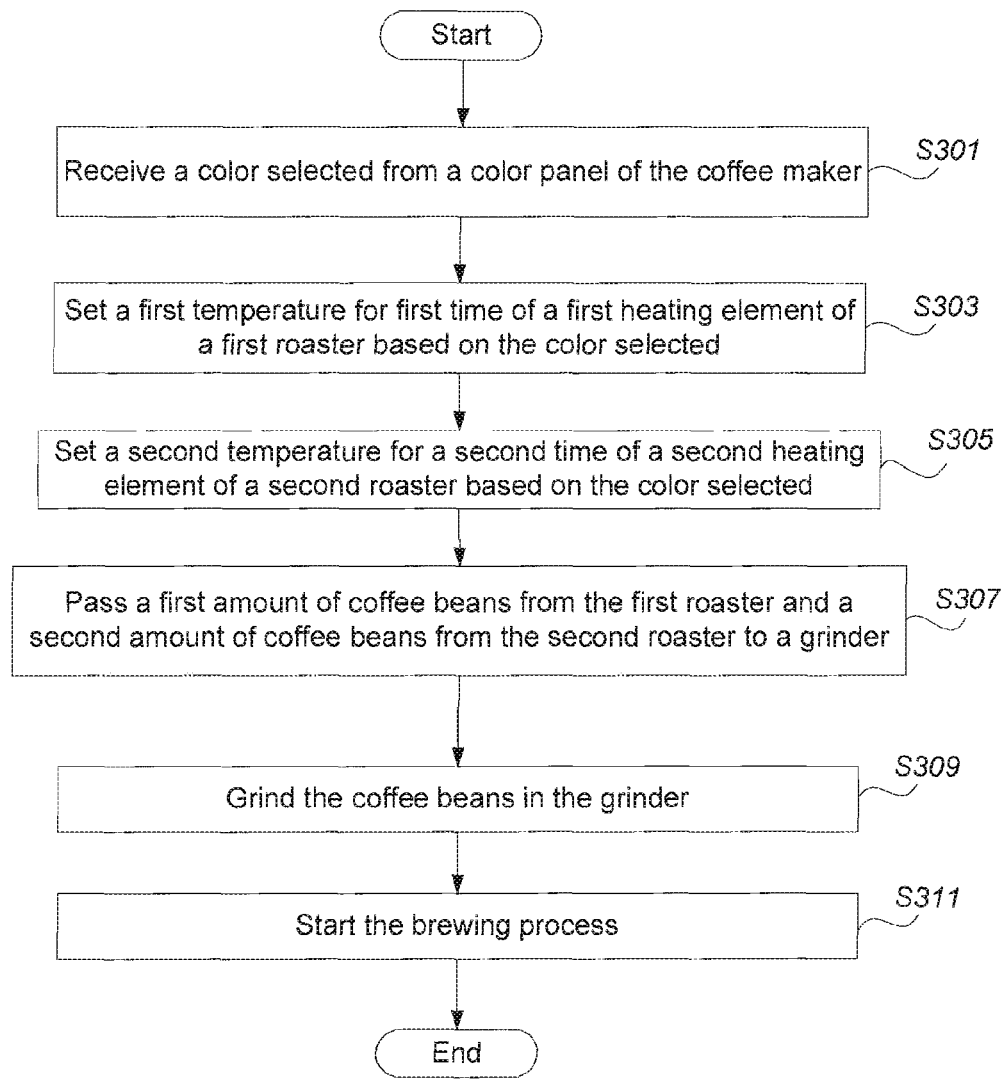
FIG. 3 is a flow chart of an exemplary coffee brewing process according to an exemplary embodiment of the present disclosure.

FIG. 3 is a flow chart of an exemplary coffee brewing process according to an exemplary embodiment of the present disclosure. The coffee brewing process begins when the start button S1 is activated and a color is selected from the color panel 161 of the coffee maker 100.

In step S301, the coffee-color controller 40 receives a color selected from a color panel of the coffee maker. Each color of the coffee corresponds to a specific temperature and time for which the coffee beans should be roasted in the first roaster 101A and the second roaster 101B. For example, table 1 presents sample temperature, time, and amount of coffee beans used to make one cup of coffee. The amount of coffee beans can be measured in volume, or weight. For example, the amount of coffee beans can be measured in ounces or in grams. Table 1 data can be stored and retrieved from a database 410 of the coffee-color controller 40. The amount of coffee beans can vary depending on a size, shape, or weight of a coffee bean. As such, an approximate amount of coffee beans required to make one cup of coffee can be pre-determined experimentally, where the factors varied include type or species of coffee beans (e.g., coffee beans from different regions such as Columbia, India, Mexico, Guatemala, etc., or species such as Arabic, Robusta, Liberica, etc.), size of coffee beans, shape of the coffee beans, or a combination thereof.

| Color | First temperature | Second temperature | First Time (min.) | Second Time (min.) | First amount (grams) | Second amount (grams) |
|---|---|---|---|---|---|---|
| B1 (yellow) | 200° C. | 100° C. | 10 | 15 | 10 | 15 |
| B2 (tan) | 300° C. | 150° C. | 8 | 12 | 10 | 10 |
| B3 (light brown) | 300° C. | 200° C. | 10 | 10 | 10 | 8 |
| B4 (dark brown) | 350° C. | 250° C. | 15 | 10 | 15 | 10 |
| B5 (light French) | 250° C. | 200° C. | 12 | 14 | 20 | 10 |
| B6 (full French) | 350° C. | 250° C. | 15 | 15 | 20 | 5 |

Based on the color selected from the color panel 161, the coffee-color controller 40 sets or adjusts the first roaster 101A at the first temperature and the first time to roast the coffee beans, in step S303. Further, in step S305, the coffee-color controller 40 sets or adjusts the second roaster 101B at the second first temperature and the second time to roast the coffee beans. The temperature in the first roaster 101A can be monitored using the first temperature sensor 110A and the temperature in the second roaster 101B can be monitored using the second temperature sensor 110B.

The amount of time required to roast the coffee beans can be high (in several hours) and it may be advantageous to pre-roast the coffee beans. As such, the coffee-color controller 40 can be programmed to perform the steps S301, S303, and S305 in advance, thus roasting the coffee-beans in advance and delaying the grinding and brewing. For example, the coffee-color controller 40 can include a pre-roast setting that roasts the coffee-beans in advance, e.g., at night before making the coffee next morning. Pre-roasting the coffee beans can save time, and make the coffee making process quicker compared to roasting the coffee beans in real-time while being able to enjoy the taste or flavor of freshly roasted coffee-beans.

In step S307, the coffee-color controller 40 opens the first discharge door 107A and the second discharge door 107B to pass the first amount of coffee beans from the first roaster 101A and the second amount of coffee beans from the second roaster 101B to the grinder 121. The first amount of coffee beans and the second amount of coffee beans depend on the coffee-color and the number of cups of coffee requested. The ensure a first amount of coffee beans and a second amount of coffee beans are discharged, opening and closing of the first discharge door 107A and the second discharge door 107B should be controlled accordingly. An amount of time the first discharge door 107A and the second discharge door 107B should be opened can be pre-determined by experimentation based on different types of coffee beans, size and shape of the coffee beans, etc. and recording an average amount of coffee beans discharged per second. As such, the amount of coffee beans will be an average value obtained from experimentation. The amount of coffee beans discharged per second can the stored in a memory 402 of the coffee-color controller 40. For example, an average amount of coffee beans discharge per second can be 5 grams. So, if the first amount of coffee beans required is approximately 10 grams, then the first discharge door 107A of the first roaster 101A should be opened for 2 seconds. Similarly, if the second amount of coffee beans required is approximately 12 grams, then the second discharge door 107B of the second roaster 101B should be opened for 2.4 seconds.

In step S309, the coffee-color controller starts the grinder 121 to grind the coffee beans. After grinding the coffee beans, the measuring device 129 is activated to deliver the ground coffee to the brewing container 131. Operation of the measuring device 129 was discussed earlier in the present disclosure with respect to FIG. 2. Accordingly, to prepare one cup of coffee, the ground coffee will be discharged in the receptacle 202 (in the first position P1) by opening the discharge door 127 of the grinder 121 and allowing the ground coffee to be collected in the receptacle 202. The amount of time for which the discharge door 127 is opened can be determined experimentally and an average time required to fill the receptacle 202 can be established. The amount of time to keep the discharge door 127 open can be stored in the memory 402 of the coffee-color controller 40.

From the first position P1, the receptacle 202 is moved to the second position P2 to drop the ground coffee in the brewing cup 131. Such measuring activity can be repeated several times depending on the number of cups of coffee requested. For example, for four cups of coffee, the measuring device 129 will be operated four times.

In step S311, the brewing process is started by passing hot water from the water tank 151. The amount of water passed to the brewing container 131 depends on the number of cups of coffee requested. The amount of water passed can be controlled by controlling a valve (not shown) installed in a pipe connecting the water tank 151 and the brewing container 131, as shown in FIG. 1. In one embodiment, other existing methods of controlling the amount of water for preparing coffee can be implemented. Details of the water tank 151 and controlling the amount of water are well known and omitted for brevity.

Figure 4:
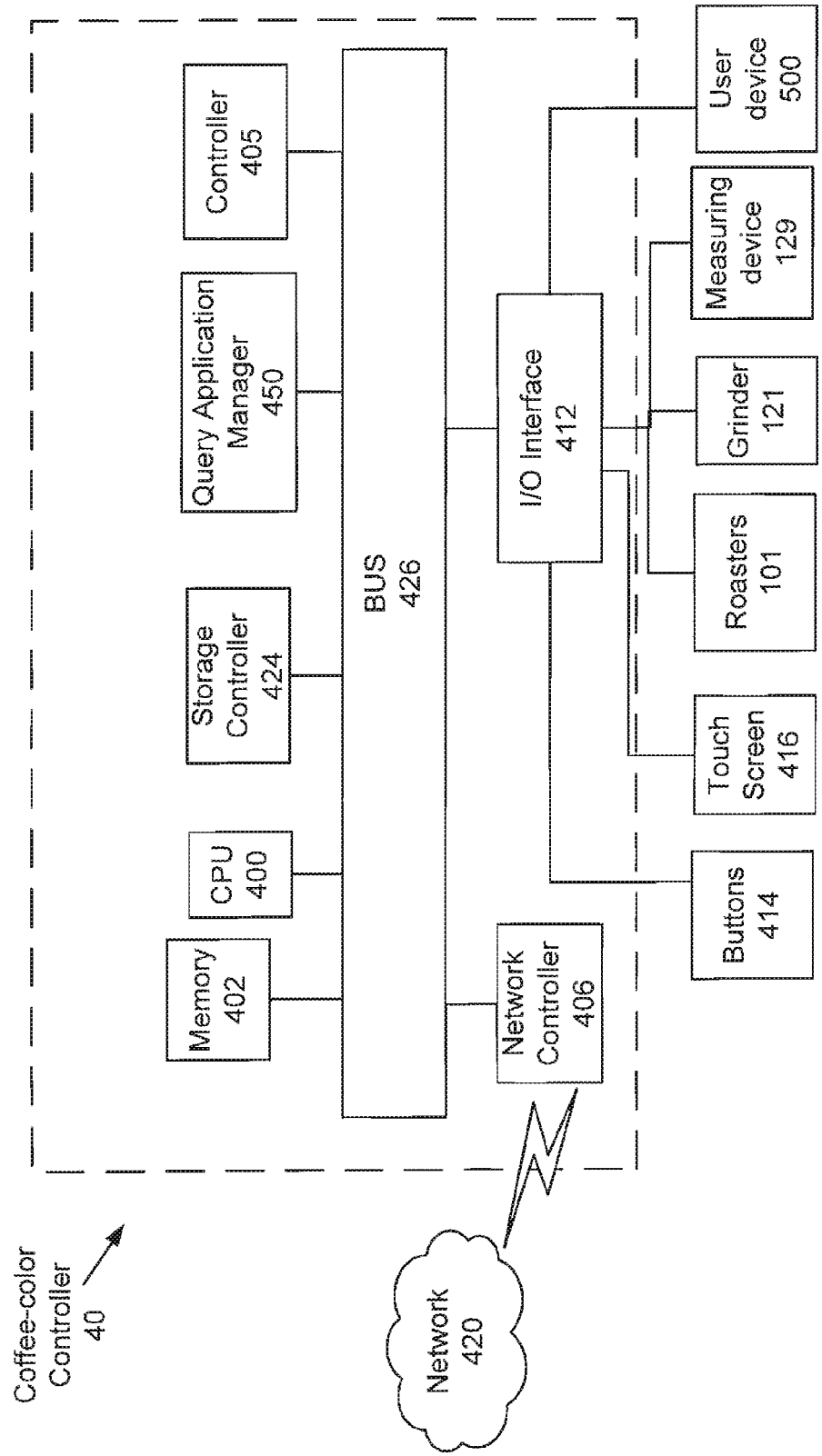
FIG. 4 is a detailed block diagram illustrating an exemplary coffee-color controller according to certain embodiments of the present disclosure.

FIG. 4 is a detailed block diagram illustrating an exemplary coffee-color controller 40 according to certain embodiments of the present disclosure. In FIG. 1, the coffee-color controller 40 includes a CPU 400 which can be configured to receive inputs from buttons B1-B7 and perform the processes described in the present disclosure with respect to FIG. 3. For example, the CPU 400 can be programmed to control the temperature of the first roaster 101A and the second roaster 101B, open and close the first discharge door 107A and the second discharge door 107B, start and stop the grinder 121, open and close the discharge door 127 of the grinder, operate the measuring device 129, and activate the brewing process. The process data and instructions may be stored in the memory 402.

The hardware elements, in order to achieve the coffee-color controller 40, may be realized by various circuitry elements, known to those skilled in the art. For example, CPU 400 may be a XENON or Core processor from INTEL of America or an Opteron processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above with respect to FIG. 3.

The coffee-color controller 40, in FIG. 4, also includes a network controller 406 for interfacing with a network 420. Such network based interfacing can be useful to send commands from an external device such as a user device 500 that is configured to communicate with the coffee maker 100. Thus, a user can send command to start the roasting of coffee beans, to start the brewing process, and to request the number of cups of coffee remotely. For example, the user can send signal to the coffee maker 100 (located in a kitchen) to start roasting or grinding the coffee beans from a bedroom as soon as the user wakes up and before starts getting ready for work.

As can be appreciated, the network 420 can be a public network, such as the Internet, or a private network such as an LAN or WAN network, or any combination thereof and can also include PSTN or ISDN sub-networks. The network 420 can also be wired, such as an Ethernet network, or can be wireless such as a cellular network including EDGE, 3G and 4G wireless cellular systems. The wireless network can also be WiFi, BLUETOOTH, or any other wireless form of communication that is known.

An I/O interface 412 interfaces with buttons 414, which is an exemplary representation of different buttons including S1, B1, B2, B3, B4, B5, B6, and B7. The functionality of the buttons 414 can also be implemented on a touch screen 416. Further, the coffee-color controller 40 is connected to the roasters 101, the grinder 121, and the measuring device 129. Optionally, the coffee-color controller 40 can be connected to a user device 500 such as a smartphone, laptop, touchpad, etc. via the I/O interface 412 or through the network 420. The user device 500 can send queries that are handled by a query application manager 450 including extracting data from the memory 402 via the storage controller 424, or trigger execution of processes discussed in FIG. 3.

The controller 405 can be used to implement optimization algorithms and may include one or more CPUs, and may control each element in the coffee maker 100 to perform functions related to communication control, audio signal processing, control for the audio signal processing, still and moving image processing and control, and other kinds of signal processing. The controller 405 may perform these functions by executing instructions stored in a memory 402, for example, the processes illustrated in FIG. 3.

The storage controller 424 connects the memory 402 with communication bus 426, which may be an ISA, EISA, VESA, PCI, or similar device, for interconnecting all of the components of the coffee-color controller 40. A description of the general features and functionality of the storage controller 424, network controller 406, and the I/O interface 412 is omitted herein for brevity as these features are known.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. An coffee maker, comprising:
    a first roaster fitted with a first heating element to roast coffee beans at a first temperature, a first discharge door, and a first temperature sensor at the bottom of the first roaster;
    a second roaster fitted with a second heating element to roast coffee beans at a second temperature, a second discharge door, and a second temperature sensor at the bottom of the second roaster;
    a funnel attached to the first roaster and the second roaster providing a passage for a first amount and a second amount of coffee beans received from the first roaster and the second roaster, respectively;
    a grinder having a blade at a bottom of the funnel and a discharge door at a bottom of the grinder;
    a brewing container at the bottom of the grinder;
    a color panel including a plurality of buttons, each of the plurality of the buttons corresponding to a color of a coffee desired after brewing; and
    a coffee-color controller configured to control the first temperature and the second temperature of the first roaster and the second roaster, respectively, based on the color of the coffee selected from the color panel.

2. The coffee maker according to claim 1, further comprising a measuring device, wherein the measuring device includes a receptacle to measure the amount of ground coffee from the grinder to pass to the brewing container.

3. The coffee maker according to claim 2, wherein the measuring device occupies a first position to collect the ground coffee in the receptacle, and a second position to deliver the ground coffee to the brewing container.

4. The coffee maker according to claim 3, wherein the first position of the measuring device aligns the receptacle to the discharge door of the grinder while making contact with the underside of the grinder.

5. The coffee maker according to claim 3, wherein the second position of the measuring device aligns the receptacle at an angle greater than 90° using a motor and a gear mechanism.

6. The coffee maker according to claim 1, wherein the first heating element includes a first top heater and a first bottom heater installed on a first shaft.

7. The coffee maker according to claim 6, wherein the first shaft is driven by a first motor installed on the underside of the first roaster.

8. The coffee maker according to claim 1, wherein the second heating element includes a second top heater and a second bottom heater installed on a second shaft.

9. The coffee maker according to claim 8, wherein the second shaft is driven by a second motor installed on the underside of the second roaster.

10. The coffee maker according to claim 1, wherein the coffee-color controller is further configured to control a solenoid operated first discharge door to control the first amount of coffee beans.

11. The coffee maker according to claim 10, wherein the coffee-color controller is further configured to control a solenoid operated second discharge door to control the second amount of coffee beans passed through a second discharge door of the second roaster.

* * * * *